United States Patent
Kruse et al.

(10) Patent No.: US 6,606,384 B1
(45) Date of Patent: Aug. 12, 2003

(54) MULTIMEDIA COMMUNICATION TERMINAL

(75) Inventors: Bernd Kruse, Altenbeken (DE); Bernhard Lutz, Delbrück (DE); Udo Tewes, Bad Oeynhausen (DE); Uwe Urban, Paderborn (DE)

(73) Assignee: Wincor Nixdorf GmbH & Co. KG, Paderborn (DE)

( * ) Notice: Subject to any disclaimer, the term of this patent is extended or adjusted under 35 U.S.C. 154(b) by 0 days.

(21) Appl. No.: 09/623,887
(22) PCT Filed: Mar. 8, 1999
(86) PCT No.: PCT/DE99/00616
§ 371 (c)(1), (2), (4) Date: Sep. 11, 2000
(87) PCT Pub. No.: WO99/48294
PCT Pub. Date: Sep. 23, 1999

(30) Foreign Application Priority Data

Mar. 16, 1998 (DE) .......................... 198 11 358

(51) Int. Cl.$^7$ ............................................ H04M 1/00
(52) U.S. Cl. ........................ 379/428.03; 379/428.04
(58) Field of Search ................ 379/428.01, 428.03, 379/428.04, 435, 436

(56) References Cited

U.S. PATENT DOCUMENTS

| | | | | |
|---|---|---|---|---|
| 4,856,045 A | * | 8/1989 | Hoshina | 379/428.03 |
| 4,888,795 A | | 12/1989 | Ando et al. | 379/53 |
| 5,008,924 A | * | 4/1991 | Guichard et al. | 379/428.03 |
| 5,577,118 A | * | 11/1996 | Sasaki et al. | 379/428.03 |

FOREIGN PATENT DOCUMENTS

| | | |
|---|---|---|
| DE | 42 36 665 | 5/1994 |
| DE | 43 23 336 | 1/1995 |
| EP | 0 683 613 | 11/1995 |
| EP | 0 773 686 | 5/1997 |

\* cited by examiner

Primary Examiner—Jack Chiang
(74) Attorney, Agent, or Firm—McCormick, Paulding & Huber LLP

(57) ABSTRACT

A channel (20) for accommodating a fully or partially cylindrical body (22) is formed above a visual display unit (16) in a multimedia communications terminal (10) having a console-like housing (12). This body (22) comprises a central body element (26) in which a video camera is installed, and at least one projection (28; 30) on which a rest (42) for a telephone handset (44) is integrally formed, or a card reader for telephone calls is also installed.

11 Claims, 2 Drawing Sheets

MULTIMEDIA COMMUNICATION TERMINAL

FIELD OF THE INVENTION

The invention relates to a multimedia communications terminal as claimed in the precharacterizing clause of claim 1.

BACKGROUND OF THE INVENTION

Until now, telephones have been the most widely used communications means, but multimedia communications means have been used increasingly in particular since the introduction of the ISDN network. To achieve this, multimedia communications terminals are required which can be used to detect and reproduce not only voice but also video images. The ergonomics of a multimedia communications terminal are subject to particular requirements, especially in public communications facilities such as telephone boxes. Such facilities are used by people with widely differing body sizes. However, it should be possible for the video camera to detect them all, and allow them to monitor the visual display unit easily. This is particularly difficult in a confined telephone box, in which the user stands closely in front of the communications terminal.

Multimedia communications terminals of said type which satisfy the requirements mentioned above are disclosed in U.S. Pat. No. 4,856,045 and DE 42 36 665. Both terminals have a base housing which at the same time acts as a free-standing base and on which a moving housing is mounted via a cantilever arm. The moving housing is mounted on the base housing such that it can pivot about a shaft running parallel to the front edge of the base housing. The moving housing is thus fitted not only with the visual display unit but also with the video camera, so that these functional elements can easily be matched to the body size of a user, by pivoting the moving housing.

However, the assembly formed by the video camera and the visual display unit in a moving housing has disadvantages, which are particularly apparent when the visual display unit is designed to have a touch-sensitive surface as a so-called touch screen. When touched by a finger, it is impossible to avoid the moving housing vibrating, and this vibration is necessarily passed on to the video camera. However, this leads to the video image jittering at the receiver end of a communications link.

SUMMARY OF THE INVENTION

The object of the invention is to propose a multimedia communications terminal which is equipped with the functional elements required for public communications facilities, and in which the video camera is decoupled from vibration of the visual display unit.

This object is achieved by the features of claim 1.

In this case, the visual display unit is installed in a front surface of the housing and a channel for accommodating at least one fully cylindrical body or body which is cylindrical at least in the area of the channel, is formed above the visual display unit in the communications terminal. The video camera is installed in the fully or partially cylindrical body, and a rest for the telephone handset is integrally formed on it. In addition to the rest, a card reader for credit cards or telephone cards—which may be smart cards or magnetic strip cards or a combination of both—may also be installed in the fully or partially cylindrical body.

The multimedia communications terminal is thus equipped with all the functional elements required in public communications facilities and necessary for sound and video communication or else, in addition, for non-cash payment for the communications services used. The arrangement of the visual display unit and the video camera in separate housing parts has the advantage of vibration decoupling between them. The vibration protection is also assisted by the compact design of the communications terminal since no cantilever arm is required for the connection between the housing and the fully or partially cylindrical body, which would together form a system which could oscillate mechanically. Nevertheless, the video camera and the visual display unit can still be moved relative to one another. To this end, the fully or partially cylindrical body is mounted in the channel such that it can rotate about its longitudinal axis, which coincides with the axis of the channel.

In a development of the invention, the fully or partially cylindrical body projects beyond the housing on at least one side, and the rest for the handset is integrally formed on the projection, or the card reader is installed in it. This has the advantage that the connecting cable for the handset can hang down freely alongside the housing. The same applies to a chain or strap fitted on the telephone card—young people in particular frequently protect their telephone card against loss in this way. Furthermore, the card reader and thus one of the projections accommodating the latter can be dispensed with entirely for toll-free use of the multimedia communications terminal, for example in the private domain or when used as a service telephone. This can be done particularly easily with a modular design, which will be described in detail further below, of the fully or partially cylindrical body comprising a central body element, a left-hand projection and/or a right-hand projection. The projection which accommodates the card reader can then easily be omitted. It is self-evident that a hook switch is also installed in the rest for the handset.

The fully or partially cylindrical body preferably projects beyond the housing on both sides, with the card reader being installed in one projection, and the rest being integrally formed on the other projection. There is then sufficient space for the installation of at least one loudspeaker, the video camera, a microphone for a so-called hands-free function and an indicating device for the status of the communications terminal in a central area of the fully or partially cylindrical body, located above the visual display unit.

In a development of the feature mentioned above, two loudspeakers, which form the basis of a stereo reproduction system, are installed in the central body element of the fully or partially cylindrical body, and at least the video camera is arranged between them. Since a user unconsciously positions himself in the correct hearing position in front of the communications terminal, this virtually automatically results in him being aligned in the correct position for the video camera.

In one preferred development of the communications terminal according to the invention, the fully or partially cylindrical body is subdivided into at least two body elements which are arranged axially alongside one another and can be rotated independently of one another about a longitudinal axis which they share. The subdivision is preferably carried out in such a way that the fully or partially cylindrical body is subdivided into a central body element forming the central area, a left-hand projection and a right-hand projection. In consequence, at least the visual display unit, the video camera, the rest for the handset and the card reader can be adjusted freely with respect to one another in accordance with the requirements for wall mounting or table-top mounting of the communications terminal, and in accordance with a user's body size.

In order to allow the user to position himself at the correct height for the video camera relative to his body size, in a further preferred development of the invention, a handwheel is arranged at at least one end of the fully or partially cylindrical body and is connected to the central body element such that they rotate together, in such a manner that rotation of the handwheel allows the central body element to be rotated relative to the left-hand projection, relative to the right-hand projection and relative to the housing.

Since the rest for the handset and the card reader need to be adjusted only once, depending on the ergonomic requirements, for wall mounting or table-top mounting of the communications terminal, the left-hand and/or right-hand projection can be rotated relative to the housing and relative to the central body element, and can be fixed in the set position in such a manner that it cannot be moved from this position from outside the housing.

Further features and advantages of the invention are evident from the following description, which uses an exemplary embodiment to explain the invention, in conjunction with the attached drawings.

DETAILED DESCRIPTION OF THE PREFERRED EMBODIMENTS

Figure 1:
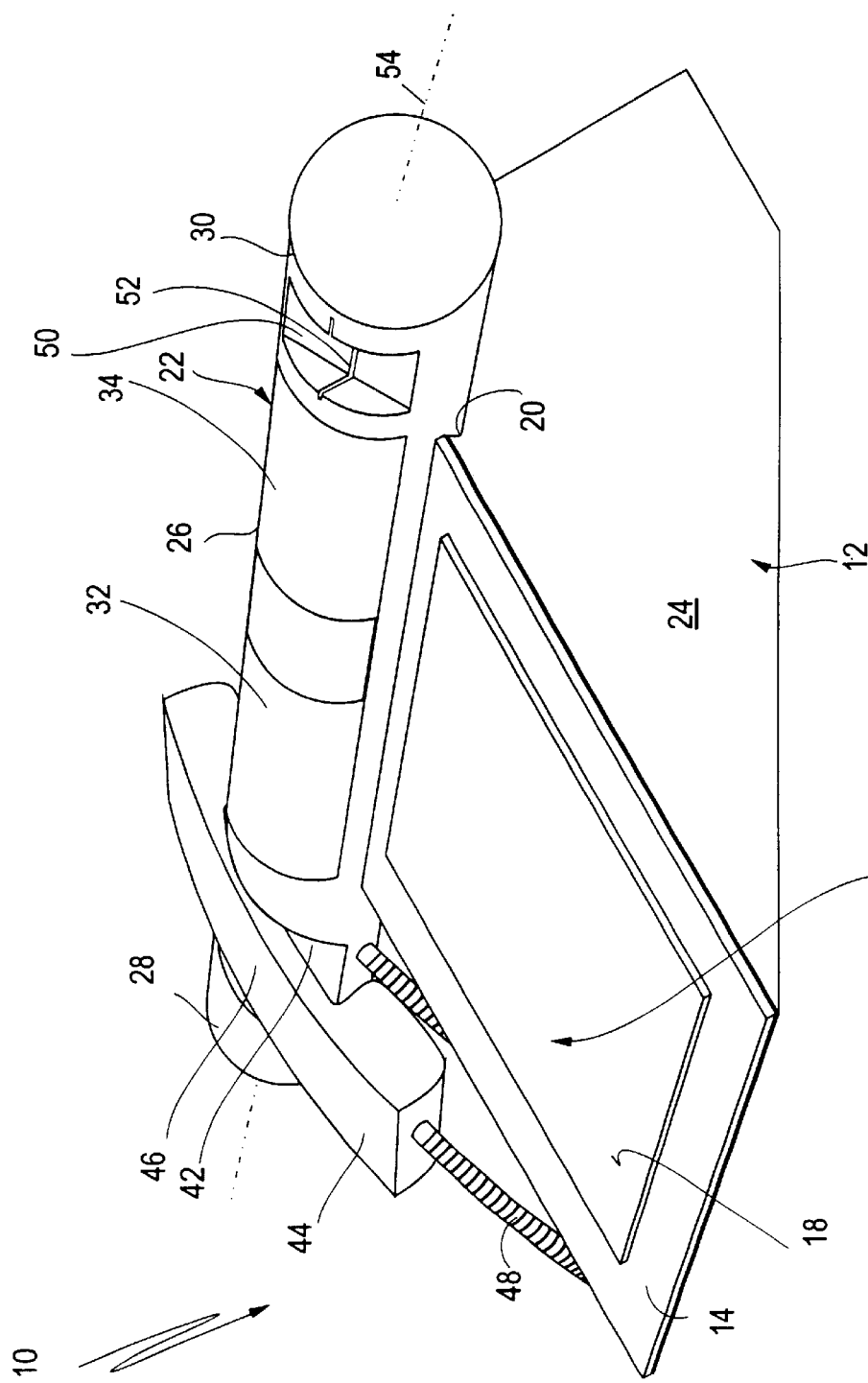
FIG. 1 shows a perspective front view of a multimedia communications terminal.

FIG. 1 shows a perspective front view of a multimedia communications terminal 10, having a housing 12 whose side profile is essentially triangular. A visual display unit 16 is installed in a front panel 14 of the housing 12, which rises to the rear like a console, and whose screen surface 18 is in the form of a so-called touch screen. A channel 20, whose cross section is in the form of a section of a circle is formed in the front panel 14 close to the upper edge of the triangular housing 12, and a cylindrical body 22 is mounted in this channel 20 such that it can rotate.

The cylindrical body 22 projects on both sides beyond the side walls 24 (only the right-hand side wall can be seen in FIG. 1). The cylindrical body 22 comprises three parts: a central body element 26, a left-hand projection 28 and a right-hand projection 30. A left-hand loudspeaker 32 and a right-hand loudspeaker 34 are installed in the central body element 26. A microphone 36, a video camera 38 and a status indication 40 are arranged between these loudspeakers, distributed over the circumference of the cylindrical body 22 (FIG. 2).

A trough-like rest 42 for a handset 44 is formed in the left-hand projection 28 and is used as a rest for the grip part 46 of the handset 44. The connecting cable 48 of the handset 44 emerges from the left-hand projection, underneath the rest 42. An operating element of a known hook switch projects into the rest 42 in a manner which is known and is therefore not shown.

A grip trough 50 is formed in the right-hand projection 30 and has a card slot 52 of a telephone card reader, the rest of which is not shown, incorporated in its center. The card slot 52 runs parallel to the longitudinal axis 54 of the cylindrical body 22.

Figure 2:
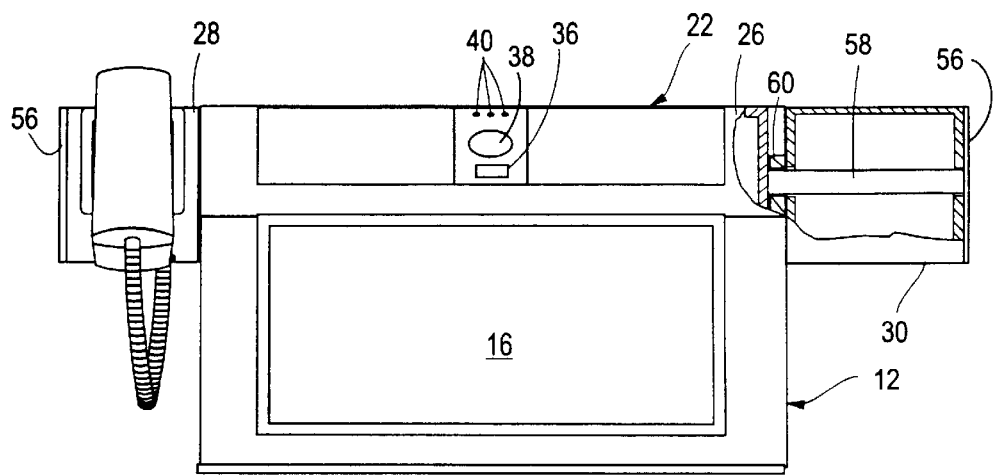
FIG. 2 shows a partially cut-away front view of the communications terminal shown in FIG. 1.

FIG. 2 shows a partially cut-away front view of the multimedia communications terminal 10. This figure shows that the central body element 26, the left-hand projection 28 and the right-hand projection 30 of the cylindrical body 22 are cylinder elements which are separated from one another and are aligned coaxially with respect to one another.

A handwheel 56 is arranged at each of the free ends of the left-hand and right-hand projections 28, 30 and is connected to the central body element 26 via a shaft 58, which passes through the respective projection 28, 30, such that they rotate together. The shaft 58 is mounted in bearing blocks 60, which are integrally formed on the right and left of the front panel 14 (only the right-hand bearing block can be seen in FIGS. 2 and 3). Rotation of one of the handwheels 56 allows the central body element 26 to be rotated relative to the left-hand projection 28, relative to the right-hand projection 30, and relative to the housing 12. In consequence, any user can adjust the inclination of the optical axis of the video camera 38, and can thus set it at the correct height relative to his body size. If there is no right-hand projection 30, for example because no card reader is required for the intended use of the communications terminal 10, the handwheel 56 is fitted directly to the central body element 26.

Figure 3:
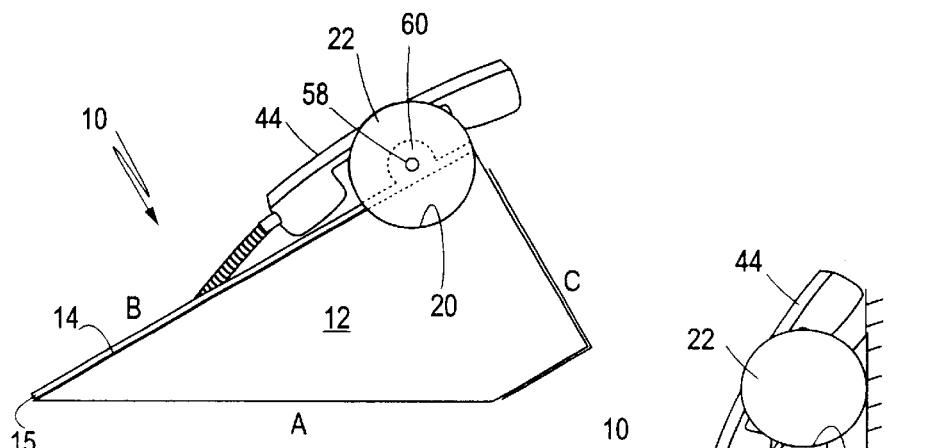
FIG. 3 shows a side view of the communications terminal shown in FIG. 1, as a table-top terminal.

FIG. 3 shows a side view of the multimedia communications terminal 10 as a free-standing or table-top terminal. The major surfaces of the housing 12 are denoted by A, B and C. In the table-top version, the surface A of the communications terminal 10 is in the form of a mounting surface, while the front panel 14 together with the visual display unit 16 are fitted to the surface B. The channel 20 is formed in the front panel 14 above the visual display unit 16; the lower edge 15 of the front panel 14 is thus located close to the housing edge formed by the surfaces A and B.

Figure 4:
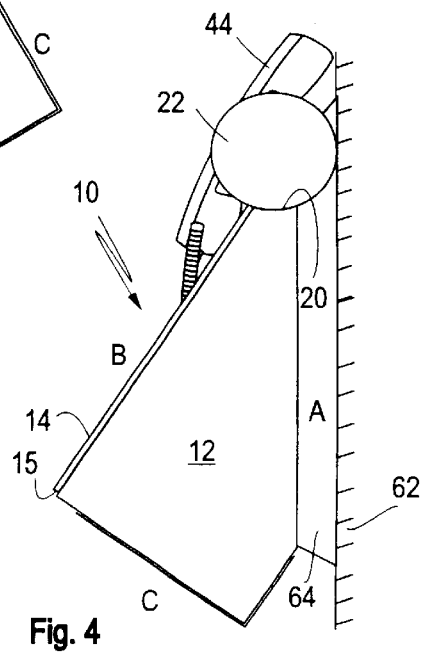
FIG. 4 shows a side view of the communications terminal shown in FIG. 1, as a wall-mounted terminal.

FIG. 4 shows a side view of the same communications terminal 10 as a wall-mounted terminal. The major surfaces of the housing 12 are denoted by A, B and C, in the same way as in FIG. 3. However, it can be seen that the housing 12 is rotated such that the surface A is now used for wall mounting, while, as before, the front panel 14 together with the visual display unit 16 are fitted to the surface B. However, the front panel 14 is rotated through 180° relative to the housing 12, so that its lower edge 15 is now close to the housing edge formed by the surfaces B and C. As before, the channel 20 is used to accommodate the cylindrical body 22. Since the cylindrical body 22 projects beyond the surface B to the rear for wall mounting of the communications terminal 10, a wall-mounting box 64 is arranged between the housing 12 and the wall 62 to which the communications terminal 10 is fitted, and is at the same time used to accommodate the electrical cables leading to the communications terminal 10.

FIGS. 3 and 4 show that the rest 42 for the handset 44 and the card reader need to be adjusted differently depending on the ergonomic requirements for table-top mounting or for wall mounting of the communications terminal 10. This need be done only once when setting up the terminal as the free-standing or wall-mounted version. The left-hand projection 28 and the right-hand projection 30 can thus be rotated relative to the housing 12 and relative to the central body element 26, and can be fixed in the set position such that, once the position has been set, it cannot be moved from outside the housing 12.

What is claimed is:

1. A multimedia communications terminal (10), comprising a housing (12), a visual display unit (16) which is arranged like a console installed in a front surface (B) of the housing (12), a video camera (38) and a telephone handset (44), characterized in that a channel (20), running parallel to the top edge of the visual display unit (16), for accommodating at least one fully cylindrical body (22) or body (22) which is partially cylindrical at least in the area of the channel (20) is formed above the visual display unit (16) in the communications terminal (10), in that the fully or partially cylindrical body (22) is mounted in the channel (20) such that it can be rotated about its longitudinal axis (54), which coincides with the axis of the channel (20), and in that the video camera (38) is installed in the fully or partially cylindrical body (22), a rest (42) for the telephone handset (44) is integrally formed on the fully or partially cylindrical body (22) and, in addition, a card reader for smart cards or magnetic strip cards is installed in the fully or partially cylindrical body (22).

2. The arrangement as claimed in claim 1, characterized in that the fully or partially cylindrical body (22) projects beyond the housing (12) on one side, and in that the card reader is installed in the projection (30), and/or the rest (42) is integrally formed on the projection (28).

3. The arrangement as claimed in claim 1, characterized in that the fully or partially cylindrical body (22) projects beyond the housing (12) on both sides, and in that the card reader is installed in one projection (30), and the rest (42) is integrally formed on the other projection (28).

4. The arrangement as claimed in claim 1, characterized in that at least one loudspeaker (32, 34), a microphone (36), the video camera (38) and an indicating device (40) for the status of the communications terminal (10) are installed in a central body element (26) of the fully or partially cylindrical body (22).

5. The arrangement as claimed in claim 4, characterized in that two loudspeakers (32, 34), which form the basis of a stereo reproduction system, are installed in a central body element (26) of the fully or partially cylindrical body (22), and in that at least the video camera (38) is arranged between them.

6. The arrangement as claimed in claim 1, characterized in that the fully or partially cylindrical body (22) is subdivided into at least two body elements (26, 28; 26, 30) which are arranged axially alongside one another and can be rotated independently of one another about a longitudinal axis (54) which they share.

7. The arrangement as claimed in claim 6, characterized in that the fully or partially cylindrical body (22) is subdivided into a central body element (26), a left-hand projection (28) and a right-hand projection (30).

8. The arrangement as claimed in claim 7, characterized in that a handwheel (56) is arranged at at least one end of the fully or partially cylindrical body (22) and is connected to the central body element (26) such that they rotate together, in such a manner that rotation of the handwheel (56) allows the central body element (26) to be rotated relative to the left-hand projection (28), relative to the right-hand projection (30), and relative to the housing (12).

9. The arrangement as claimed in claim 8, characterized in that the left-hand and/or right-hand projection (28, 30) can be rotated relative to the housing (12) and relative to the central body element (26), and can be fixed in the set position in such a manner that it cannot be moved from this position from outside the housing (12).

10. The arrangement as claimed in claim 1, characterized in that the visual display unit (16) is installed in a front panel (14), and in that a shaft (58) connected to the central body element (26) of the fully or partially cylindrical body (22) such that they rotate together is mounted in at least one bearing block (60), arranged on the front panel (14), such that it can rotate.

11. The arrangement as claimed in claim 1, characterized in that the housing (12) can be used as a free-standing housing or as a wall-mounted housing, with a first surface (A) being used as a mounting surface or as a wall-mounting surface, and a second surface (B) being fitted with the front panel (14).

* * * * *